(12) United States Patent
Jiao et al.

(10) Patent No.: US 8,049,760 B2
(45) Date of Patent: Nov. 1, 2011

(54) SYSTEM AND METHOD FOR VECTOR COMPUTATIONS IN ARITHMETIC LOGIC UNITS (ALUS)

(75) Inventors: Yang (Jeff) Jiao, San Jose, CA (US); Chien Te Ho, San Jose, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 842 days.

(21) Appl. No.: 11/610,169

(22) Filed: Dec. 13, 2006

(65) Prior Publication Data

US 2007/0182746 A1 Aug. 9, 2007

Related U.S. Application Data

(60) Provisional application No. 60/765,654, filed on Feb. 6, 2006.

(51) Int. Cl.
*G06F 15/80* (2006.01)
(52) U.S. Cl. .......... 345/505; 345/561; 712/28; 712/221; 712/223; 708/490
(58) Field of Classification Search .................. 708/490; 711/100
See application file for complete search history.

(56) References Cited

U.S. PATENT DOCUMENTS

| | | | |
|---|---|---|---|
| 4,876,644 A * | 10/1989 | Nuechterlein et al. ......... 712/30 |
| 7,020,769 B2 * | 3/2006 | Goodrich ..................... 712/241 |
| 7,398,347 B1 * | 7/2008 | Pechanek et al. ............. 711/100 |
| 7,574,583 B2 * | 8/2009 | Leijten et al. ................. 712/24 |
| 2005/0254436 A1 * | 11/2005 | Hoe et al. .................... 370/252 |
| 2006/0053189 A1 * | 3/2006 | Mantor ........................ 708/490 |
| 2006/0282826 A1 * | 12/2006 | Dockser ...................... 717/127 |

OTHER PUBLICATIONS

Mirsky, E.; DeHon, A.; , "MATRIX: a reconfigurable computing architecture with configurable instruction distribution and deployable resources," FPGAs for Custom Computing Machines, 1996. Proceedings. IEEE Symposium on , vol., No., pp. 157-166, Apr. 17-19, 1996 doi: 10.1109/FPGA.1996.564808.*

* cited by examiner

*Primary Examiner* — Xiao Wu
*Assistant Examiner* — Phi Hoang
(74) *Attorney, Agent, or Firm* — Thomas, Kayden, Horstemeyer & Risley, LLP

(57) ABSTRACT

The present disclosure describes implementations for processing instructions and data across multiple Arithmetic Logic Units (ALUs). In one implementation, a graphics processing apparatus comprises a plurality of ALUs configured to process independent instructions in parallel. Pre-processing logic is configured to receive instructions and associated data to be directed to one of the plurality of ALUs for processing from a register file, the pre-processing logic being configured to selectively format received instructions for delivery to a plurality of the ALUs. In addition, post-processing logic is configured to receive data output from the plurality of the ALUs and deliver the received data to the register file for write-back, the post-processing logic being configured to selectively format data output from a plurality of the ALUs for delivery to the register file as though the data had been output by a single ALU.

18 Claims, 9 Drawing Sheets

SYSTEM AND METHOD FOR VECTOR COMPUTATIONS IN ARITHMETIC LOGIC UNITS (ALUS)

CROSS REFERENCE TO RELATED APPLICATION

This application claims the benefit of U.S. provisional application Ser. No. 60/765,654, filed Feb. 6, 2006, the contents of which are incorporated by reference herein.

BACKGROUND

Pipelined computing or processing architectures are well known, and such pipelined architectures vary in depth (e.g., the number of pipeline stages). Many pipelined architectures include five basic pipeline stages: (1) fetch, (2) decode, (3) execute, (4) memory access, and (5) writeback stages. The general operation of these stages is well known.

Reference is made to FIG. 1 showing a portion of such a basic pipelined architecture. Specifically, shown in FIG. 1 is a register file 12 and an arithmetic logic unit (ALU) 14. Typically, the execute stage of a pipelined architecture includes one or more processing units (such as an ALU) for carrying-out processing operations associated with the instruction. The ALU 14 of FIG. 1 includes various dashed lines to represent multiple cycles of operation (e.g., clock cycles).

With regard to the register file 12, as is known, data is retrieved from system memory into a "register file," which is an area of high-speed memory, configured in the form of registers. Once data is in the register file 12, it typically can be retrieved by any of the pipeline stages (e.g., fetch, execute, etc.) unit within a single clock cycle. The register file 12 has also been depicted near the bottom of FIG. 1 (in dashed line) to denote the writeback communication of data from the execute stage (or ALU 12) to the register file 12. To simplify the illustration, other pipeline stages have not been depicted.

As is known, to improve the efficiency of multi-dimensional computations, Single-Instruction, Multiple Data (SIMD) architectures have been developed. A typical SIMD architecture enables one instruction to operate on several operands simultaneously. In particular, SIMD architectures may take advantage of packing several data elements into one register or memory location. With parallel hardware execution, multiple operations can be performed with one instruction, resulting in significant performance improvement and simplification of hardware through reduction in program size and control. Some SIMD architectures perform operations in which the corresponding elements in separate operands are operated upon in parallel and independently.

Reference is now made to FIG. 2, which is a diagram illustrating an architecture similar to FIG. 1, but depicting a plurality of ALUs 16, 18, 20, and 22. Such an architecture is efficient in many SIMD applications. For efficient operation in such an architecture, data is organized in the register file 12 such that operands (or other associated data) can be readily loaded (in parallel) into the various ALUs in the same clock cycles.

Notwithstanding the improved efficiency realized by the architecture of FIG. 2, further improvements to this architecture are desired.

SUMMARY

The present disclosure is directed to novel methods and apparatus for performing processing operations in multiple ALUs. In accordance with one embodiment, a graphics processing apparatus is provided comprising a plurality of arithmetic logic units (ALUs) configured to process independent instructions in parallel. Pre-processing logic is configured to receive instructions and associated data to be directed to one of the plurality of ALUs for processing from a register file, the pre-processing logic being configured to selectively format received instructions for delivery to a plurality of the ALUs. Post-processing logic configured to receive data output from the plurality of the ALUs and deliver the received data to the register file for write-back, the post-processing logic being configured to selectively format data output from a plurality of the ALUs for delivery to the register file as though the data had been output by a single ALU.

In another embodiment, a graphics processing apparatus comprises a register file, logic for managing processing of a plurality of threads, and a plurality of arithmetic logic units (ALUs). The embodiment further comprises logic capable of selectively configuring consecutive data in the register file associated with a given processing thread to be successively delivered to a single one of the ALUs in response to a first processing mode, said logic capable of selectively configuring consecutive data in the register file associated with a given processing thread to be successively delivered to different ones of the ALUs in response to a second processing mode.

In yet another embodiment, a method is provided for processing operations in a plurality of arithmetic logic units (ALUs). The method comprises retrieving an instruction and associated data from a register file, determining a mode of operation, and delivering the retrieved instruction and associated data directly to the plurality of ALUs if the mode is determined to be a horizontal mode. The method further comprises reformatting the retrieved instruction and associated data such that items originally formatted for delivery to adjacent ALUs are reformatted for delivery into a single ALU, and thereafter delivering the reformatted instruction and associated data to the plurality of ALUs.

In another embodiment, a method processes instructions and data. The method receives instructions and associated data from a register file and determines which one of two modes is active for the received instructions and associated data. The method further delivers the instructions and data directly to a plurality of arithmetic logic units (ALUs) for processing, without reorganizing, when a first mode is active, and reorganizes the instructions and data, and then delivering the instructions and data to the plurality of ALUs for processing, when a second mode is active.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
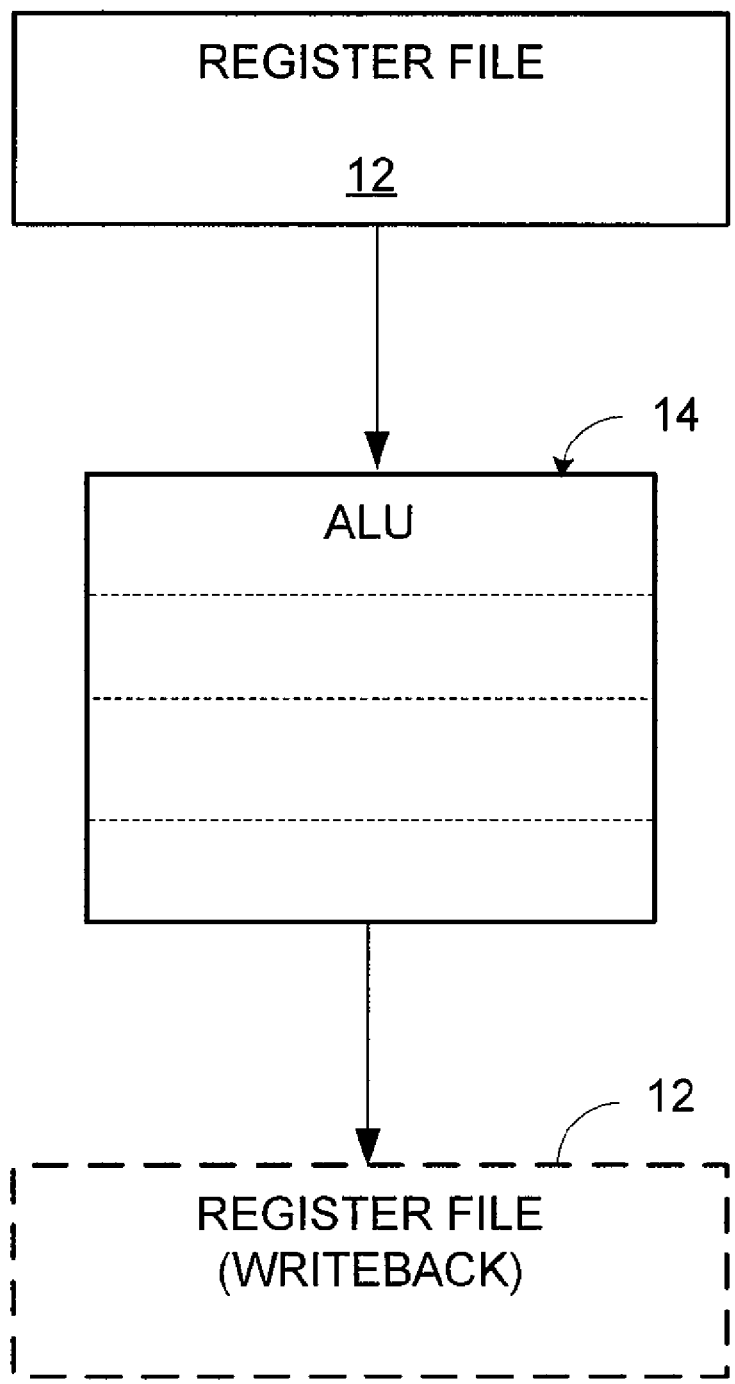
FIG. 1 is a block diagram illustrating a portion of a pipelined processor architecture, as is known in the prior art.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

It has been determined, during the development of the embodiments of the present invention, that certain instructions (SIMD or other instructions) are sometimes more efficiently processed when associated data (e.g., operands) are concurrently processed in parallel ALUs. It has be further determined that, in certain contexts, overall computation efficiency is improved when associated data is processed in a single ALU. To present just one architectural or application-oriented example, in the computer graphics area, certain computations performed by graphics hardware (e.g., a geometry accelerator) are more efficiently performed when processing associated data in parallel ALUs, while other computations are more efficiently processed by a single ALU. More specifically, it has been found that operations of many geometry shader programs, for example, are more efficient when structured such that associated data is processed in parallel ALUs, while certain pixel shader programs, for example, are more efficient when structured to process associated data in a single ALU.

Embodiments of the present invention described herein provide architectures and methods for accommodating both types of processing: namely, the processing of instructions and associated data in a concurrent fashion across a plurality of parallel ALUs, as well as the processing of instructions and associated data in a single ALU. For purposes of nomenclature used herein, the term "horizontal" or "horizontal processing" will often be used to describe the processing of instructions and associated data in a concurrent fashion across a plurality of ALUs, and the term "vertical" or "vertical processing" will be used to describe the processing of instructions and associated data in a single ALU, in a serial or sequential fashion. It should be appreciated that the terms "horizontal" and "vertical" have no unique or special implications, but are utilized herein merely as convenient terms for describing the different structural architectures and processing modes of embodiments of the present invention.

As is further described herein, embodiments of the present invention broadly relate to architectures and methods that provide dynamic reconfiguration and dynamic processing of instructions and associated data, such that the instructions and associated data can be processed in either a horizontal fashion or in a vertical fashion, utilizing the same hardware. By providing such embodiments, the amount of hardware (e.g., additional ALUs and control logic) is minimized, while speed and efficiency is improved by processing different types of instructions or algorithms in different processing modes. One such general (e.g., environmental) architecture, in the context of computer graphics hardware, has been described in copending U.S. application Ser. No. 11/406,543, filed Apr. 19, 2006, which is incorporated by reference herein. As described in this copending application, a pool of execution units are provided for shared operation, such that the single pool of execution units can be allocated and configured to perform the processing of various graphics shader programs, including vertex shader programs, geometry shader programs, and pixel shader programs. As further described in this copending application, resources from the pool of execution units are allocated to the various shader programs in order to maximize overall pipeline efficiency (or minimize any processing bottlenecks that occur in any of the shader programs). As noted above, it has been found that horizontal processing is generally more efficient for geometry shader programs, while vertical processing is generally more efficient for pixel shader programs. In an architecture or environment (such as that described in the above-referenced copending application) having a single pool of shared execution units (rather than dedicated processing execution units for each shader), the reconfigurable architecture of the embodiments of the present invention are particularly well suited for such a processing architecture.

Figure 2:
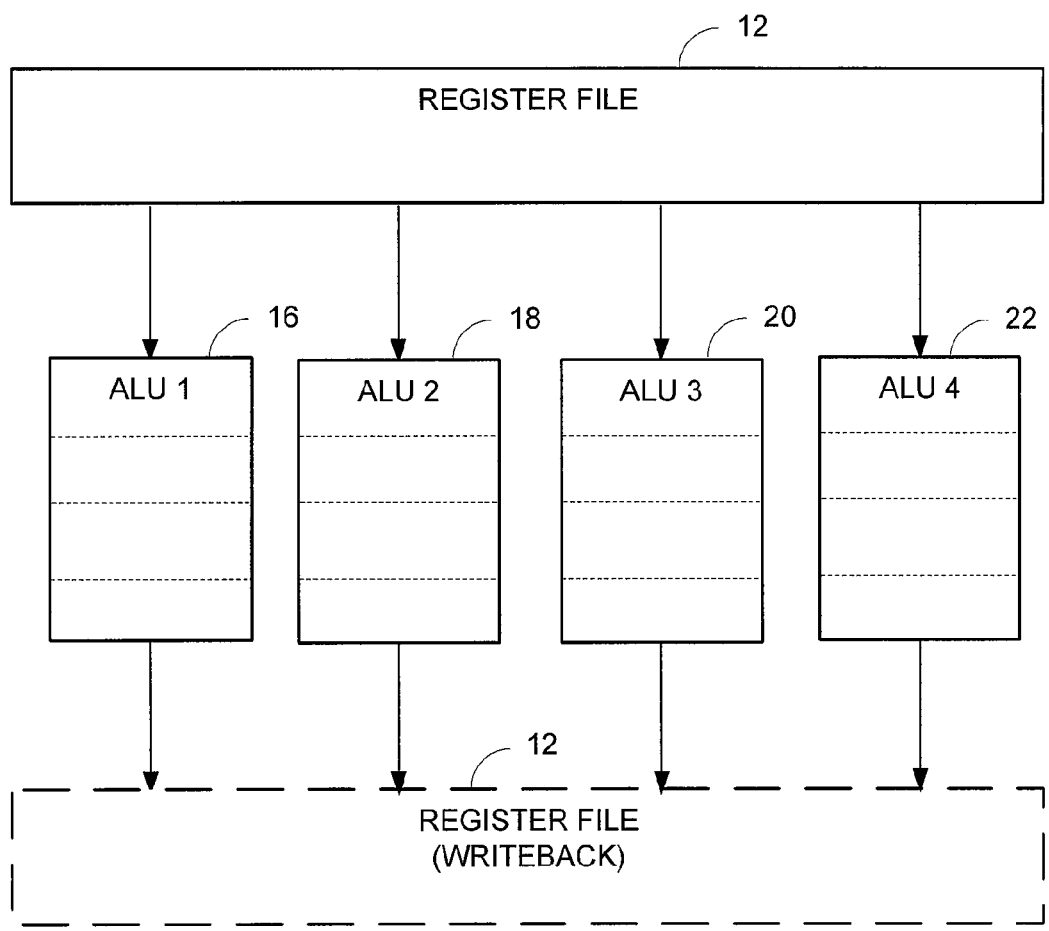
FIG. 2 is a block diagram similar to FIG. 1, but illustrating multiple ALUs configured to process instructions and/or associated data in parallel, as is known in the prior art.
Figure 3A:
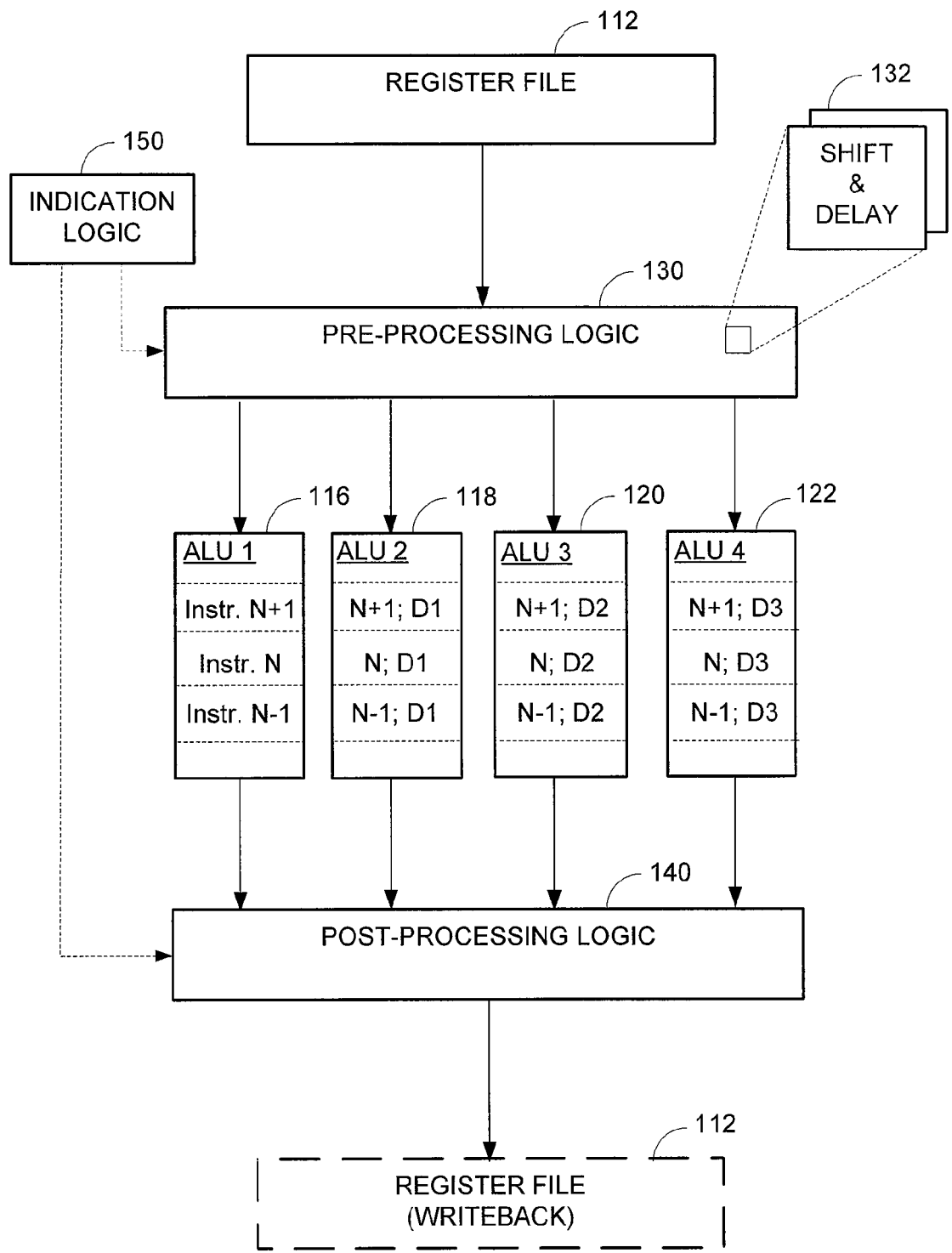
FIGS. 3A and 3B are block diagrams illustrating components of an architecture constructed in accordance with embodiments of the present invention.
Figure 3B:
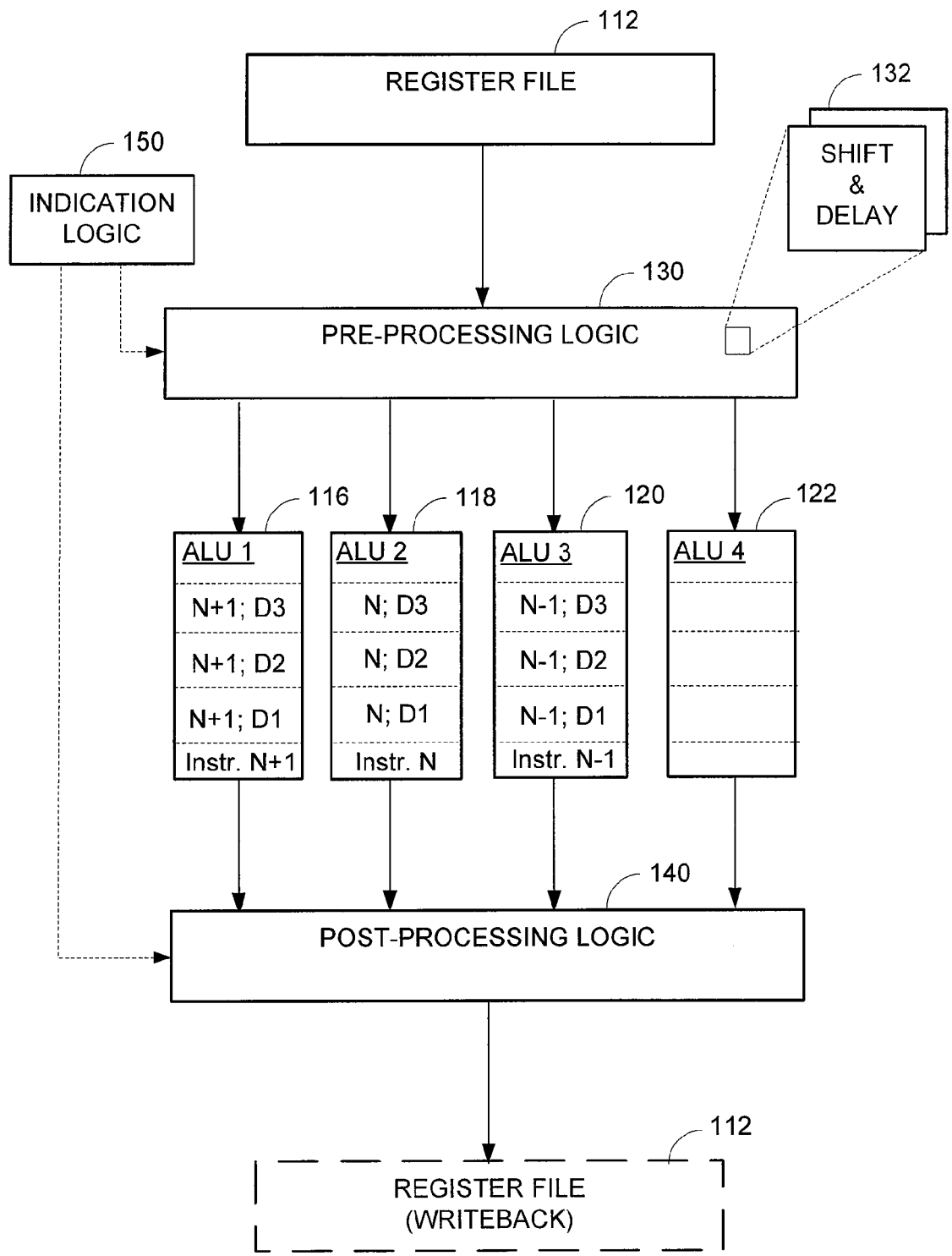

Reference is now made to FIGS. 3A and 3B, which are block diagrams illustrating the processing of an instruction and associated data in a horizontal processing mode (FIG. 3A) as well as a vertical processing mode (FIG. 3B). Similar to the diagram of FIG. 2, the embodiments illustrated in FIGS. 3A and 3B include a register file 112 and a plurality of ALUs 116, 118, 120, and 122. While the embodiments illustrated herein are shown with four ALUs 116, 118, 120, and 122, it will be appreciated that additional ALUs, or fewer ALUs may be implemented in other embodiments consistent with the scope and spirit of the present invention.

Referring first to FIG. 3A, each ALU 116, 118, 120, and 122 is illustrated as having a "depth" that illustrates the sequential processing of multiple cycles. In FIG. 3A, three such sequential instructions are illustrated (denoted as "Instr. N−1", "Instr. N", and "Instr. N+1"). In the parallel ALUs, data associated with each of these instructions is likewise illustrated. For example, ALU2 118 illustrates the data (D1) that is associated with instruction n. Likewise, in the corresponding (parallel) location of ALUs 120 and 122, associated data D2 and D3, respectively, are illustrated in conjunction with instruction n. Therefore, as instruction n is clocked into ALU1 116, associated data for that instruction is also clocked into parallel ALUs 118, 120 and 122 (assuming that such associated data exists). As will be appreciated, it may be that, for any given instruction, no associated data exists, or only one to two bytes (or words) of associated data may exist. For paths in which no associated data exists, an idle instruction or data segment may be clocked into the associated ALUs.

Referring now to FIG. 3B, the same architectural components are illustrated. However, the instructions N−1, N, and N+1, and their associated data are segregated into separate ALUs. For example, instruction n−1 and its associated data D1, D2, and D3, are all clocked into ALU 120, while instruction n and its associated data are clocked into ALU 118, and instruction N+1 and its associated data are clocked into ALU1 116.

Separately and selectively processing data in such a horizontal (FIG. 3A) or vertical (FIG. 3B) fashion allows the architecture to most efficiently process instructions based upon the type of programming or instructions to be processed.

As architecture designers will appreciate, in view of the description herein, certain types of processing will result in better performance when computed across parallel ALUs, while other types of processing will be more efficiently computed in a single ALU. Therefore, an exhaustive description of such different types of processing need not be provided herein. As one example, and as described in copending U.S. application Ser. No. 11/406,543, previously incorporated by reference herein, a certain processing architecture or environment may comprise a pool of shared execution units, each of which is configured for multithreaded operation. In such an architecture, it may be desired to have instructions from a single thread processed across the plurality of ALUs in parallel (horizontal mode processing), while in other situations it may be desirable to have instructions from a single thread processed by a single ALU. Horizontal mode processing is also referred to herein as Horizontal instruction mode processing.

As previously mentioned, data (e.g., SIMD data) is pre-organized or formatted and saved in register file 112. In accordance with certain embodiments of the present invention, the SIMD instructions and associated data are pre-organized or formatted and saved in the register file 112 such that instructions and associated data may be delivered directly to the plurality of ALUs for processing in a horizontal mode. Therefore, when instructions and associated data are such that demand processing in the vertical mode of operation (sometimes also referred to as vertical instruction mode), then the data must be reformatted, or otherwise manipulated, before being delivered to the plurality of ALUs 116, 118, 120, and 122. In certain embodiments, pre-processing logic 130 is provided to perform this data manipulation. In certain embodiments, this pre-processing logic 130 includes shift and delay logic 132 to perform a plurality of shifts (and delays) to accommodate this data manipulation. One example of an organization for such logic, in accordance with one implementation is depicted and described in connection with FIG. 6.

Referring to the depiction of FIG. 3B, where ALU3 120 is less sequentially loaded with instruction n−1 and associated data D1, D2, and D3, the instruction N−1 can be directly delivered to ALU3 120. However, since associated data D1 was originally formatted or configured in the register file 112 for delivery into ALU2 118, shift and delay logic 132 delays (by one cycle) the delivery of data D1 and shifts data D1 one path or channel, so that it is delivered on the next cycle (the cycle following instruction N−1) into ALU3 120. Similarly, associated data D2 and D3 are delayed two and three cycles (respectively) and shifted two and three channels (respectively), so that they are sequentially clocked into ALU3 120.

In continuing with this example, instruction N, which was originally formatted into register file 112 for delivery to ALU1 116 is shifted for delivery, instead, to ALU2 118. Likewise, the associated data for instruction N+1 is delayed and shifted for delivery to ALU1 116.

Post-processing logic 140 is provided to effectively perform the inverse manipulation or formatting of pre-processing logic 130, before the data output from the ALUs is written back into register file 112 as though the data had been output by a single ALU. Finally, indication logic 150 provides an indication as to whether the current instruction and associated data is to be processed in accordance with horizontal mode processing or vertical mode processing. In accordance with one embodiment, the indication logic 150 may comprise a register that is set or reset by control logic for indicating whether the processing is to be performed in a horizontal or vertical mode. In this regard, reference is made to copending U.S. application Ser. No. 11/347,922 filed Feb. 6, 2006, and copending U.S. application Ser. No. 11/175,229, filed Jul. 6, 2005. The contents of both of these copending applications are incorporated herein by reference. As described in these copending applications, a mode-select register may be provided for indicating whether the current processing mode is a horizontal processing mode or a vertical processing mode.

As will be appreciated by persons skilled in the art, the shift and delay operations that are associated with the pre-processing logic 130 and post-processing logic 140 will generally require additional clock cycles when initially shifting between the two modes of processing. However, it should be further realized that the processing modes will not shift back and forth on an instruction-by-instruction basis. Instead, a series of consecutive instructions (e.g., instructions comprising a geometry shader or instructions comprising a pixel shader) will be processed in sequence in a single, given mode of operation. Therefore, the slight inefficiencies encountered when switching between modes are more that compensated for by the increased efficiency of operating in a given mode of operation.

Figure 4:
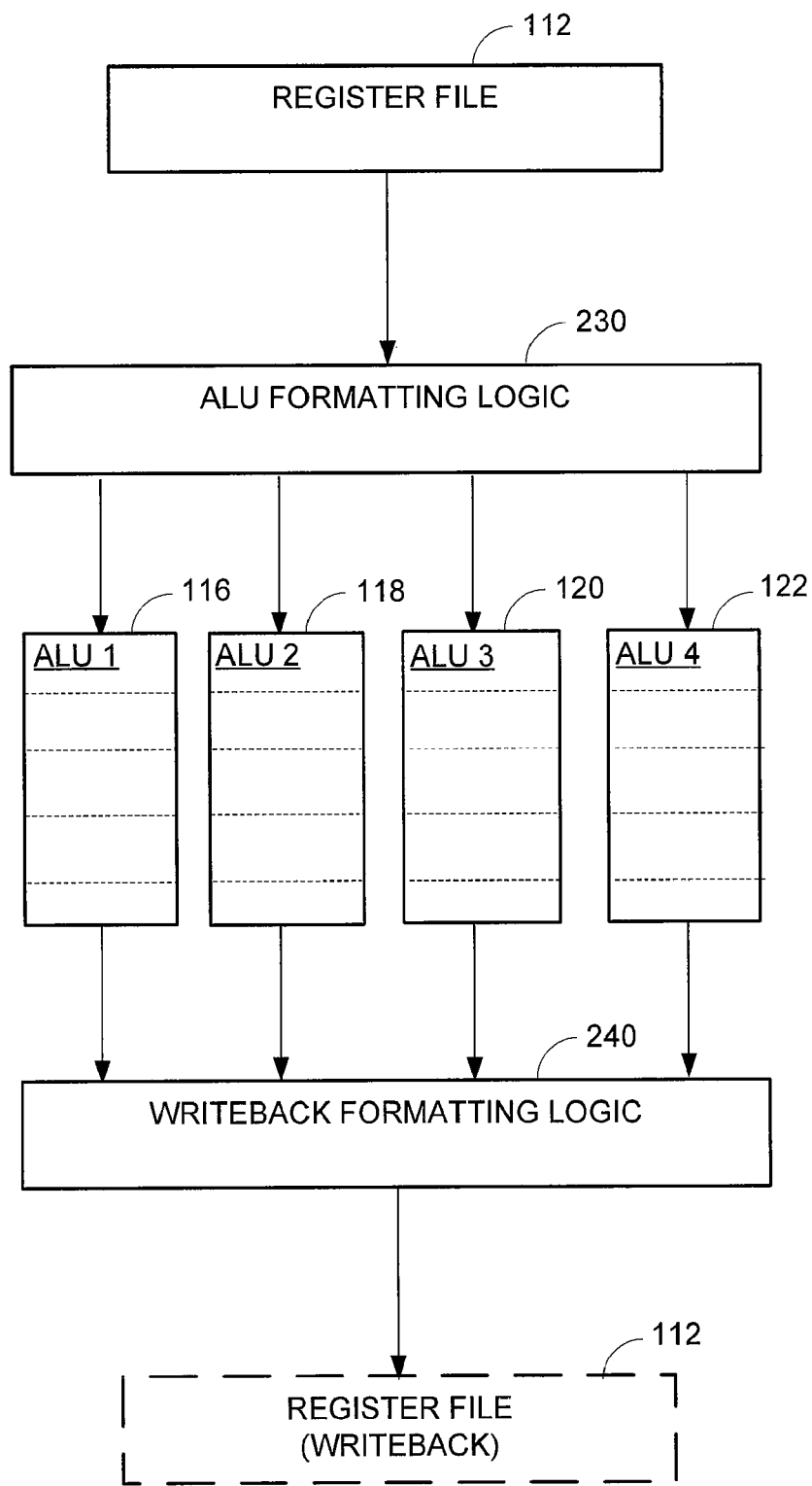
FIG. 4 is a block diagram illustrating components of an architecture constructed in accordance with embodiments of the present invention.

Having described the general structure and operation of embodiments of the present invention, reference is made to FIG. 4 which is a block diagram showing basic elements of an embodiment of the present invention. Like the embodiment of FIGS. 3A and 3B, the embodiment of FIG. 4 includes a register file 112 and a plurality of ALUs 116, 118, 120, and 122. The embodiment of FIG. 4 further includes ALU formatting logic 230 for formatting data received or retrieved from the register file 112 for delivery to the ALUs 116, 118, 120, and 122. In short, ALU formatting logic 230 operates to appropriately deliver instructions and associated data to ALUs 116, 118, 120, and 122 based upon the current mode (e.g., horizontal or vertical) of operation. Similarly, writeback formatting logic 240 is provided to format instructions and associated data output from the ALUs 116, 118, 120, 122 for delivery back to the register file 112. In accordance with the embodiments illustrated in FIG. 4, the ALU formatting logic 230 and writeback formatting logic 240 may comprise circuitry or logic for performing shift, delay, and/or rotate operations similar to the logic 130 and 140 of FIGS. 3A and 3B. Alternatively, the underlying circuitry or structure of ALU formatting logic 230 and writeback formatting 240 may differ from that of FIGS. 3A and 3B. What is significant for the embodiments illustrated in FIG. 4 is that the underlying circuitry for ALU formatting logic 230 and writeback formatting 240 is structured to accommodate the functional operation associated with the manipulation or formatting of the data between register file 112 and the ALUs 116, 118, 120, and 122, and the manipulation or formatting of data between the ALUs and register file.

Having described certain structural embodiments of the present invention, it will also be appreciated that the present invention encompasses embodiments of methods for processing instructions and data in selective and alternative horizontal and vertical modes. In this regard, reference is made to FIG. 5, which is a flow chart illustrating the high-level operation of certain embodiments of the present invention. In accordance with the methods illustrated in FIG. 5, instructions and associated data are received or retrieved from a register file (step 302). Processing of this instruction and associated data is thereafter based upon whether the processing is to be conducted in accordance with a horizontal mode of operation or a vertical mode of operation (step 304). If processed in accordance with a horizontal mode, the instruction and associated data are delivered directly from the register file to corresponding paralleled ALUs (step 306). After the ALUs process the instruction and data, outputs from the ALUs are written directly back to the register file (step 308).

Figure 5:
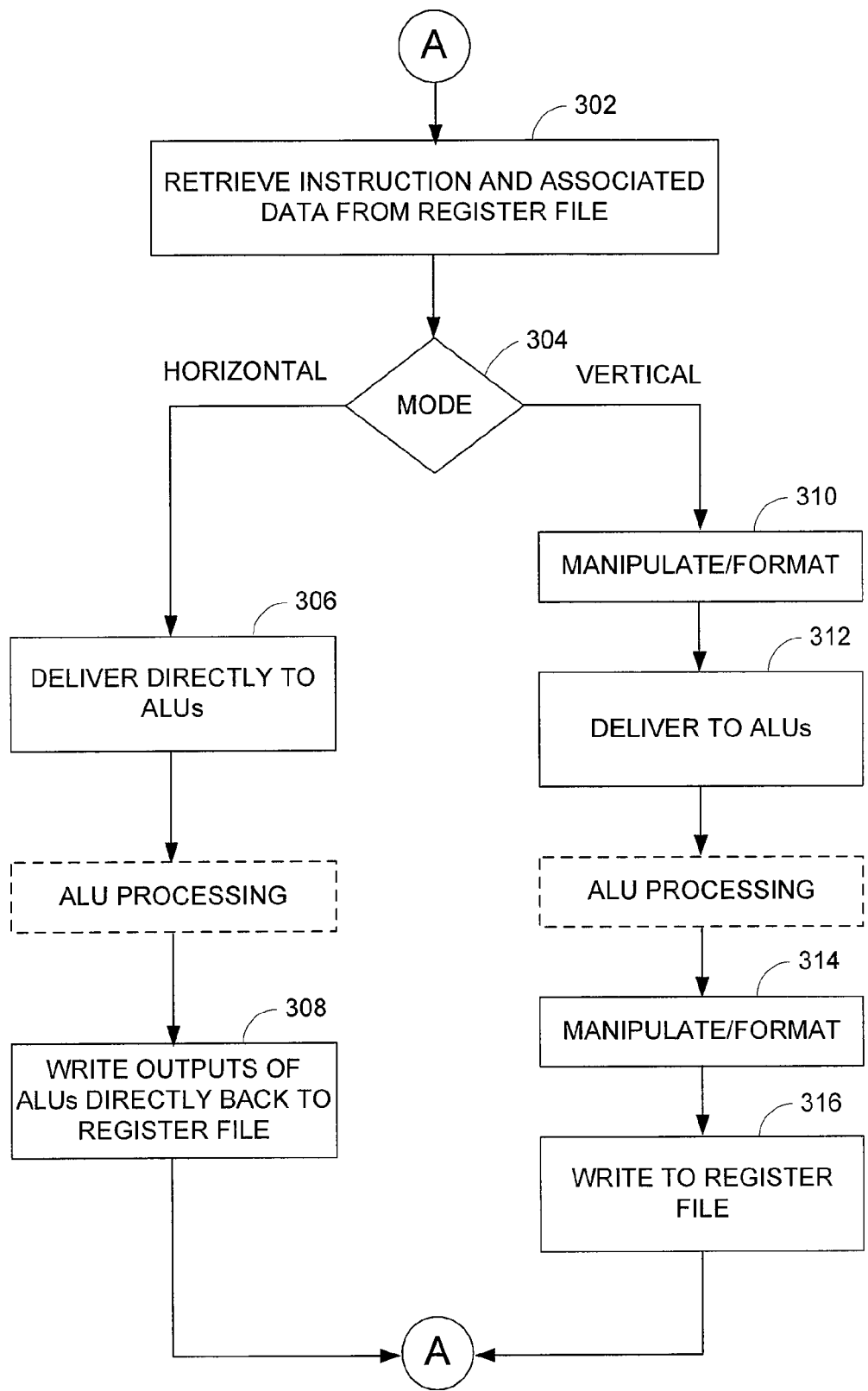
FIG. 5 is a flowchart illustrating certain high-level operations of a method executed in accordance with embodiments of the invention.

In contrast, when operating in accordance with a vertical mode, data retrieved from a register file is manipulated or formatted for delivery to the ALUs (step 310). After the instructions and associated data are manipulated, they are delivered directly to the corresponding ALUs (step 312). After the ALUs process the instructions and associated data, the outputs from the ALUs are thereafter again manipulated or reformatted (e.g. reorganized) for delivery back to the register file (step 314). Thereafter, the reorganized data is directed back to the register file (step 316). As illustrated by node "A" the processing illustrated in FIG. 5 is repeated.

It is again emphasized that the terms horizontal and vertical as used herein are arbitrary terms that are used to denote different (orthogonal) modes of operation. Furthermore, the embodiments described herein have been described on the assumption that data written into the register files is preformatted as though the data is to be processed in a horizontal mode. In accordance with these embodiments, the logic (e.g., 130 and 140 of FIG. 3 and 230 and 240 of FIG. 4) is effectively disabled or inactive, as it need not perform any function. However, when operating in a vertical mode, the reformatting or manipulating logic illustrated in FIGS. 3 and 4 will be enabled or active. Conversely, if instructions and associated data were pre-configured in the register file for operation in a vertical mode, then the data manipulating logic would be disabled when operating in the vertical mode and enabled when operating in the horizontal mode. Whether the instructions and data within the register file 112 are pre-configured for operation under vertical or horizontal mode may vary from implementation to implementation, based upon the goals and desires of the architecture design for those particular implementations. What is significant, is that the architecture of the embodiments of the present invention allow for dynamic reconfiguration of data such that a plurality of ALUs can be effectively used to process data in either a horizontal or vertical mode is realized.

Figure 6:
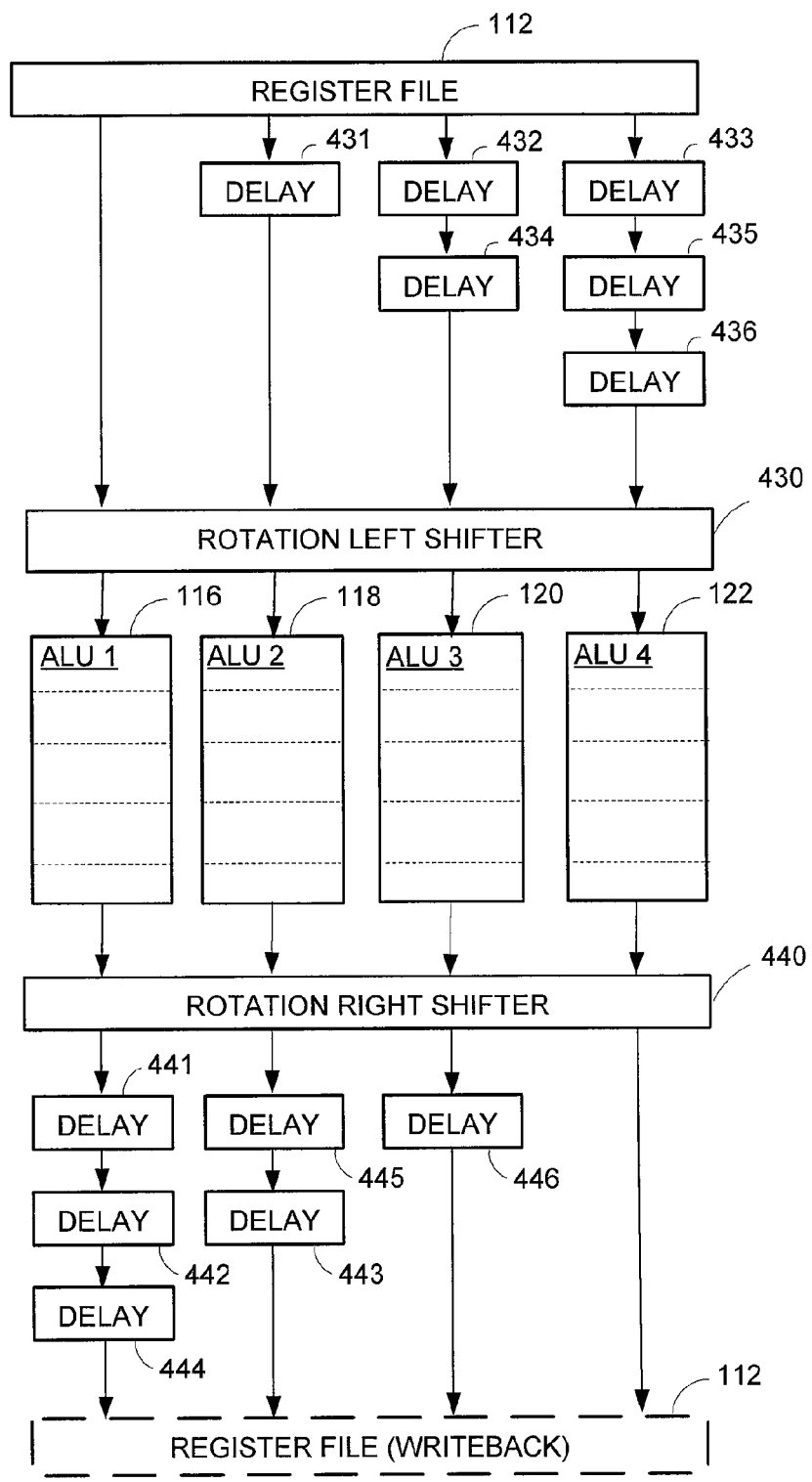
FIG. 6 is a block diagram illustrating components of an architecture constructed in accordance with embodiments of the present invention.

Reference is now made to FIG. 6, which is a block diagram similar to the diagrams of FIGS. 3A and 3B but illustrating some additional detail of a particular implementation. In the embodiments of FIG. 6, logic 430 is illustrated as a "rotation left shifter." In operation, this shifter shifts data one channel to the left, where the leftmost channel (corresponding to ALU1 116) is rotated to the rightmost position (to correspond to ALU4 122). The inverse operation is provided by the rotation right shifter of logic 440. Associated with the rotation left shifter 430 are delay elements 431, 432, 433, 434, 435, and 436. As is clearly illustrated by the data paths leading from the register file 112 to the various delay elements, and to the rotation left shifter 430, it is readily verified how data initially formatted in the register file 112 for horizontal processing is shifted and delayed such that parallel/associated data elements are arranged for a given ALU. Likewise, the inverse of this pre-processing manipulation is readily verified from the data flow paths and circuitry illustrated by the rotation right shifter 440 and associated delay elements 441, 442, 443, 444, 445, and 446.

If, rather than shifting left, as illustrated by the foregoing example, if is desired to shift the instructions and associated data to the right, then an inverted configuration of the delay elements would be implemented. In this regard, delay elements 433, 435, and 436 would be aligned to correspond to ALU1 116, while delay elements 423 and 434 would be aligned to correspond to ALU2 118, and delay element 431 would be aligned to correspond to ALU3 120.

Figure 7A:
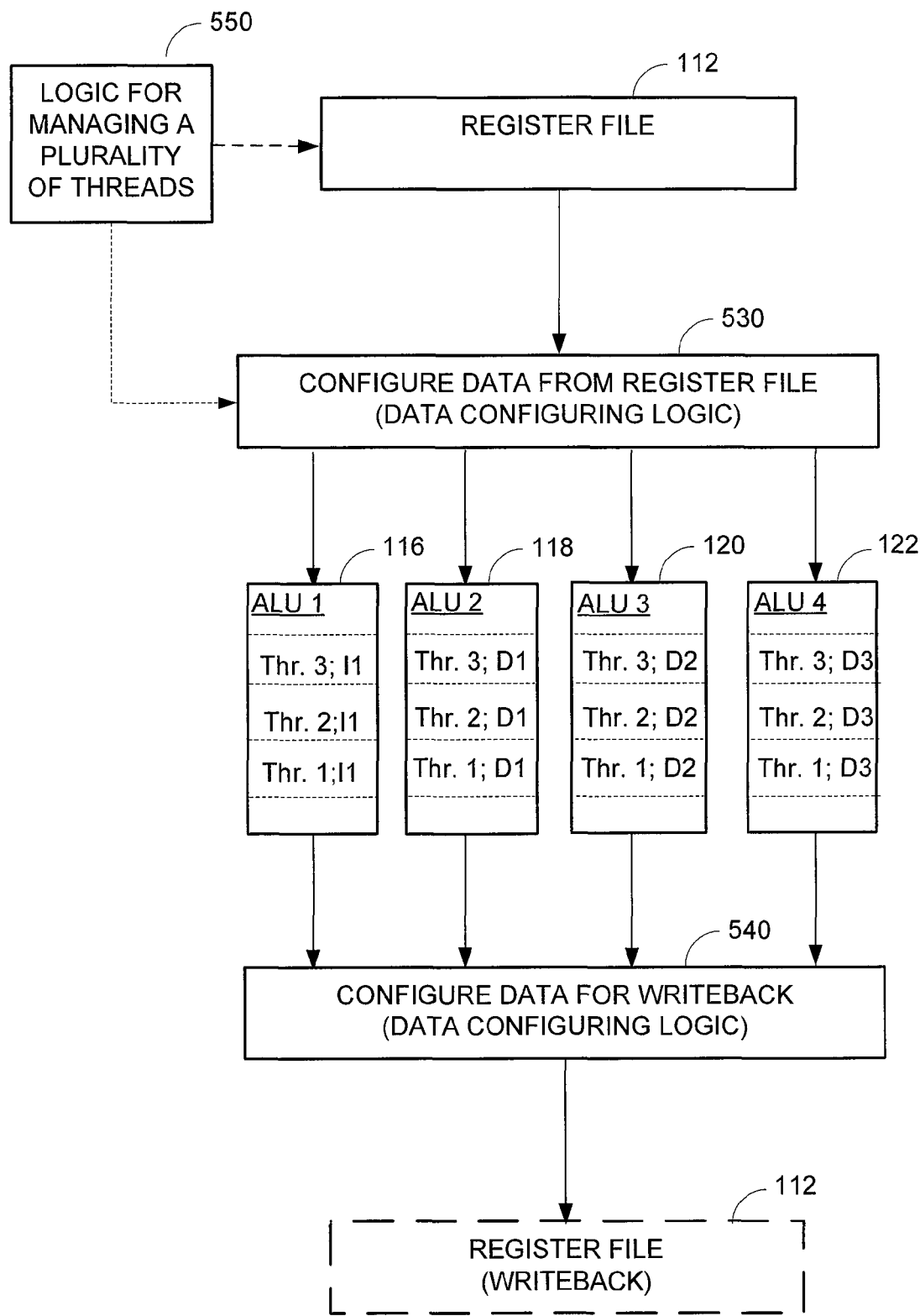
FIGS. 7A and 7B are block diagrams illustrating components of an architecture constructed in accordance with an alternative embodiment of the present invention.
Figure 7B:
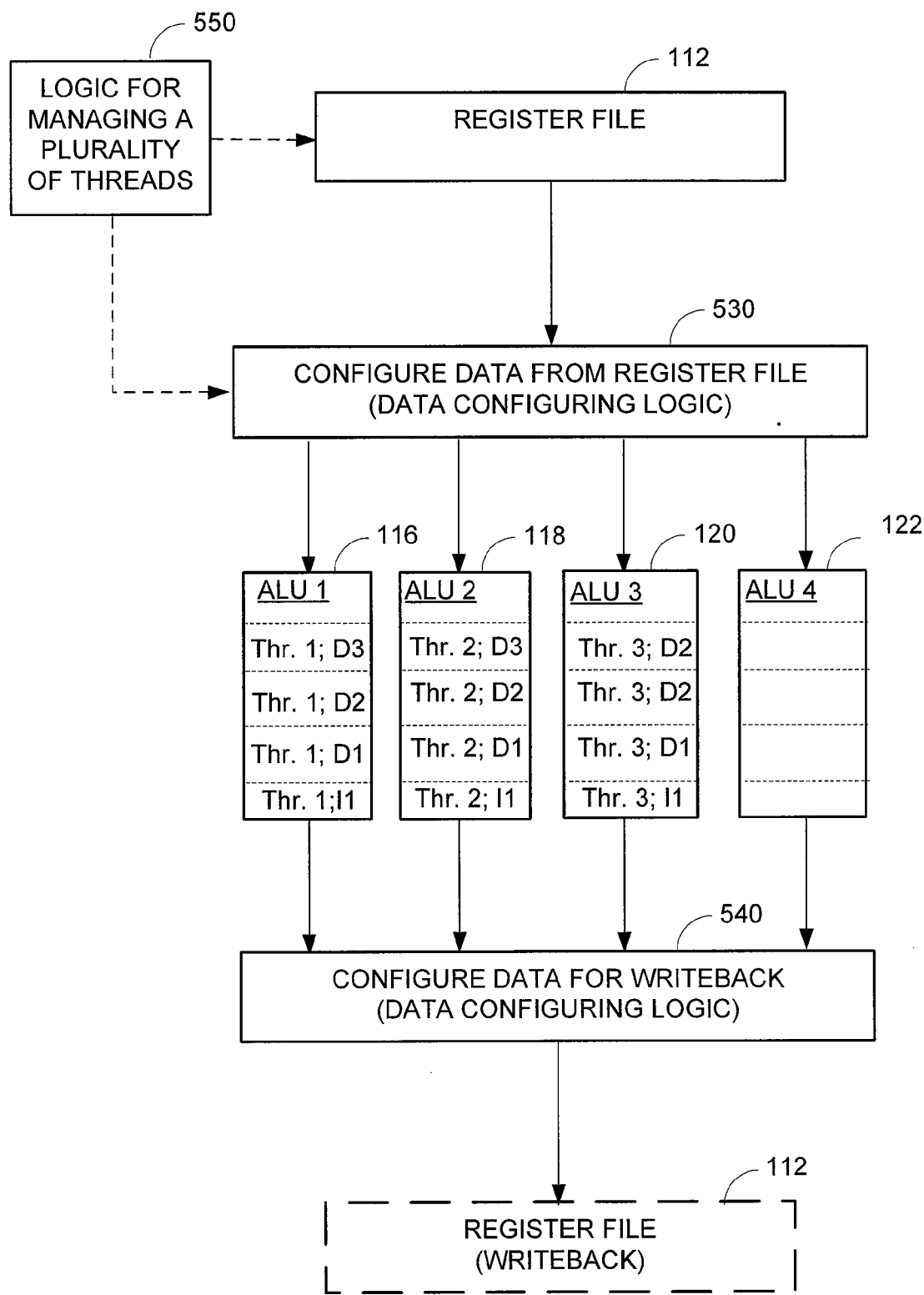

Reference is now made briefly to FIGS. 7A and 7B. FIGS. 7A and 7B are diagrams similar to FIGS. 3A and 3B, but illustrating how the architecture can be used to process instructions and associated data of different threads. As summarized above, a co-pending application describes an architecture having a shared pool of execution units which are capable of multi-threaded operation. In such an architecture, it may be desirable to execute instructions from different threads successively in a single ALU1 116, while operating on associated data in parallel ALUs 118, 120, and 122. FIG. 7A illustrates such an operation. Likewise, for certain operations, it may be preferred to process the instructions and associated data of a single instruction in a single ALU, with different threads being allocated to different ones of the ALUs. Such an approach is illustrated in FIG. 7B. Collectively, FIGS. 7A and 7B illustrate how the embodiments of the present invention can provide such flexible and robust operation as to accommodate either type of operation. The data reformatting or manipulation is handled in logic 530 and 540 (e.g., data configuring logic), in a similar fashion to the logic 130 and 140 of FIGS. 3A and 3B. In addition logic 550 is provided for managing the multiple threads (e.g., a thread manager).

In one embodiment, a graphics processing apparatus comprises a register file 112, logic 550 for managing a plurality of threads, a plurality of arithmetic logic units (ALUs) 116, 118, 120, and 122, and data configuring logic 530 and 540 capable of selectively configuring consecutive data in the register file associated with a given processing thread to be successively delivered to a single one of the ALUs in response to a first processing mode, said data configuring logic capable 530 and 540 of selectively configuring consecutive data in the register file 112 associated with a given processing thread to be successively delivered to different ones of the ALUs in response to a second processing mode.

In one embodiment, the first processing mode of the graphics processing apparatus is identified with an execution of a first shader program (not specifically shown), and the second processing mode of the graphics processing apparatus is identified with an execution of a second shader program (also not shown). As will be appreciated by persons skilled in the art, shader programs are code that defines the execution of shader programs, such as pixel shader programs, vertex shader programs, and geometry shader programs.

Although many applications currently in use can take advantage of such vertical operations, there are a number of important applications, which require the rearrangement of the data-elements before vertical operations can be implemented so as to provide realization of the application. Exemplary applications include many of those frequently used in graphics and signal processing. In contrast with those applications that benefit from vertical operations, many applications are more efficient when performed using horizontal mode operations. Horizontal mode operations can also be described in terms of memory utilization. The horizontal mode operation resembles traditional vector processing where a vector is setup by loading the data into a vector register and then processed in parallel. Processors in the state of the art can also utilize short vector processing, which implements a vector operation such as a dot product as multiple parallel operations followed by a global sum operation.

For example, a horizontal mode dot product operation may be handled in "vertical" fashion. Specifically, consider the dot product operation of DP2/3/4. This dot product operation may be handled by a sequence of multiple and accumulate (e.g., MUL & MAC) operations, as follows:

$DP2(v0.xy, v1.xy)=v0.x*v1.x+v0.y*v1.y=MUL(v0.x, v1.x), MAC(v0.y, v1.y)$ $DP3(v0.xyz, v1.xyz)=v0.x*v1.x+v0.y*v1.y+v0.z*v1.z=MUL(v0.x, v1.x), MAC(v0.y, v1.y), MAC(v0.z, v1.z)$ $DP4(v0.xyzw, v1.xyzw)=v0.x*v1.x+v0.y*v1.y+v0.z*v1.z+v0.w*v1.w=MUL(v0.x, v1.x), MAC(v0.y, v1.y), MAC(v0.z, v1.z), MAC(v0.w, v1.w)$ As will be appreciated by persons skilled in the art, the foregoing example has presented only one example of such an operation. Other examples for horizontal operations that can be handled in "vertical" fashion include gradient derivative calculations between neighboring pixels. What is relevant for purposes of the inventive embodiments is that the architectures and methods described herein may be effectively and efficiently utilized to carryout operations in both vertical and horizontal modes of operation.

In many operations, the performance of a graphics pipeline may be enhanced by utilizing vertical processing techniques, where portions of the graphics data are processed in independent parallel channels. Other operations, however, benefit from horizontal processing techniques, in which blocks of graphics data are processed in a serial manner. The use of both vertical mode and horizontal mode processing, also referred to as dual mode, presents challenges in providing a single instruction set encoded to support both processing modes. The challenges are amplified by the utilization of mode-specific techniques including, for example, data swizzling, which generally entails the conversion of names, array indices, or references within a data structure into address pointers when the data structure is brought into main memory. For at least these reasons, encoding an instruction set for a dual-mode computing environment and methods of encoding the instruction set will result in improved efficiencies.

As will be appreciated by persons skilled in the art, additional components may also be included within an execution unit for carrying out various tasks and operations, consistent with the description of the embodiments provided herein.

As used herein, the term "logic" is defined to mean dedicated hardware (i.e., electronic or semiconductor circuitry), as well as general purpose hardware that is programmed through software to carry out certain dedicated or defined functions or operations.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A graphics processing apparatus comprising:
    a plurality of arithmetic logic units (ALUs) configured to receive instructions and associated data configured for processing in parallel;
    pre-processing logic configured to receive instructions and associated data to be directed to one of the plurality of ALUs for processing from a register file, the pre-processing logic being configured to selectively format received instructions for delivery to a plurality of the ALUs based on an output of indication logic, the indication logic indicating whether a current instruction and associated data are to be processed by the plurality of ALUs in a horizontal mode or a single ALU in a vertical mode, wherein remaining ALUs are available to process additional instructions and associated data in the vertical mode, wherein the indication logic indicates whether to process in a horizontal mode or a vertical mode based on compatibility of the instructions and associated data with respect to the horizontal and vertical modes;
    post-processing logic configured to receive data output from the plurality of the ALUs and deliver the received data to the register file for write-back, the post-processing logic being configured to selectively format data output from a plurality of the ALUs for delivery to the register file as though the data had been output by a single ALU.

2. The graphics processing apparatus of claim 1, wherein the plurality of ALUs consists of precisely four ALUs.

3. The graphics processing apparatus of claim 1, wherein the pre-processing logic comprises logic configured to perform shift and delay operations.

4. The graphics processing apparatus of claim 3, wherein the pre-processing is configured to progressively shift and delay the received data across the plurality of ALUs, such that for each additional ALU to be delivered instructions or associated data, there is an additional shift and delay operation performed in the pre-processing logic.

5. The graphics processing apparatus of claim 1, wherein the post-processing logic comprises logic configured to perform shift and delay operations.

6. The graphics processing apparatus of claim 5, wherein the post-processing is configured to progressively shift and delay the received data from the plurality of ALUs, such that for each additional ALU to deliver data, there is an additional shift and delay operation performed in the post-processing logic.

7. The graphics processing apparatus of claim 1, further including indication logic configured to indicate whether data from the pre-processing logic should selectively format received instructions and data, and wherein the pre-processing logic is further configured to either format the received instructions for delivery to a single one of the ALUs or to a plurality of the ALUs depending on a state of the indication logic.

8. A graphics processing apparatus comprising:
    a register file;
    logic for managing a plurality of threads;
    a plurality of arithmetic logic units (ALUs); and
    data configuring logic capable of selectively configuring consecutive data in the register file associated with a given processing thread to be successively delivered to a single one of the ALUs in response to determining a first processing mode, wherein remaining ALUs from the plurality of ALUs are available to process a different processing thread in the first processing mode, said data configuring logic capable of selectively configuring consecutive data in the register file associated with a given processing thread to be successively delivered to different ones of the ALUs in response to determining a second processing mode, wherein the first processing mode and the second processing mode are determined based on compatibility of the consecutive data with either the first mode of operation or the second mode of operation.

9. The graphics processing apparatus of claim 8, wherein the first processing mode is a horizontal instruction mode.

10. The graphics processing apparatus of claim 8, wherein the second processing mode is a vertical instruction mode.

11. The graphics processing apparatus of claim 8, wherein the first processing mode is identified with an execution of a first shader program.

12. The graphics processing apparatus of claim 11, wherein the second processing mode is identified with an execution of a second shader program, the second shader program being different than the first shader program.

13. A method for processing instructions and data comprising:
receiving instructions and associated data from a register file;
determining which one of two modes is active based on the received instructions and associated data;
delivering the instructions and associated data directly to a plurality of arithmetic logic units (ALUs) for processing, without reorganizing, when a first mode is active; and
reorganizing the instructions and associated data, and then delivering the instructions and associated data to the plurality of ALUs for processing, when a second mode is active,
wherein remaining ALUs are available to process additional instructions and associated data in the second mode, wherein a determination to process in the first mode or the second mode is based on compatibility of the instructions and associated data with respect to the first and second modes.

14. The method of claim 13, wherein the first mode is a horizontal mode.

15. The method of claim 13, wherein the second mode is a vertical mode.

16. The method of claim 13, wherein the reorganizing further comprises shifting and delaying the instructions and data.

17. A method for processing operations in a plurality of arithmetic logic units (ALUs) comprising:
retrieving an instruction and associated data from a register file;
determining a mode of operation from among a plurality of modes based on compatibility of the instruction and associated data with the modes of operation;
delivering the retrieved instruction and associated data directly to the plurality of ALUs if the mode is determined to be a horizontal mode; and
reformatting the retrieved instruction and associated data such that items originally formatted for delivery to adjacent ALUs are reformatted for delivery into a single ALU, and thereafter delivering the reformatted instruction and associated data to the plurality of ALUs if the mode is determined to be a vertical mode,
wherein remaining ALUs are available to process additional instructions and associated data in the vertical mode, wherein a determination to process in the horizontal mode or the vertical mode is based on compatibility of the instructions and associated data with respect to the horizontal and vertical modes.

18. The method of claim 17, wherein the operations of the method collectively function to process instructions and associated data of different threads.

\* \* \* \* \*